United States Patent [19]
Beadle et al.

[11] 3,860,688
[45] Jan. 14, 1975

[54] PRODUCTION OF HIGH PURITY ALUMINA HYDRATE

[75] Inventors: Burton J. Beadle; Jack C. Ray, both of Baton Rouge, La.

[73] Assignee: Kaiser Aluminum & Chemical Corporation, Oakland, Calif.

[22] Filed: July 17, 1973

[21] Appl. No.: 380,113

[52] U.S. Cl. ................ 423/131, 423/111, 423/203
[51] Int. Cl. ............................................. C01f 7/46
[58] Field of Search .................... 423/131, 203, 111

[56] References Cited
UNITED STATES PATENTS
1,175,439   3/1916   Hagedorn ........................ 423/203
3,223,483   12/1965   Osment ............................ 423/131

*Primary Examiner*—Herbert T. Carter
*Attorney, Agent, or Firm*—Paul E. Calrow; Andrew E. Barlay

[57] ABSTRACT

Leachable soda content (expressed as $Na_2O$) of Bayer process alumina hydrate ($Al_2O_3 \cdot 3H_2O$) is reduced to below about 0.015 percent by weight by directly treating a slurry of the hydrate with steam at atmospheric pressure and at temperatures between about 60°C and 99°C. Steam treatment removes surface adhered sodium compounds and in addition renders difficulty accessible areas available to leaching. The hydrate is suitable for use as flame retardant filler for polymers, such as latex, where alkali impurities cause processing problems.

5 Claims, No Drawings

PRODUCTION OF HIGH PURITY ALUMINA HYDRATE

BACKGROUND OF THE INVENTION

Alumina hydrate ($Al_2O_3 \cdot 3H_2O$) has widespread application as flame retardant filler for polymers and the reason for this use resides in the ease of decomposition of the hydrate. A substantial portion of alumina hydrate is molecularly bound water, which at temperatures in excess of about 200°C is released. This water content absorbs sensible heat, causes a dilution effect and lowers the rate of burning in alumina hydrate filled polymers. For many polymer systems it is considered of prime importance to employ an alumina hydrate which is of high purity, since impurities, particularly leachable alkaline compounds, can detrimentally affect the properties of the filled polymers. This purity requirement becomes an absolute necessity for alumina hydrate filled latex systems. These latex systems, particularly if employed for making latex foam backed carpets, are of colloidal nature and any leachable alkaline impurity can interfere with the stability of the system. Instability can cause separation of constituents and in case of foamed latex it can result in foam collapse.

Alumina hydrate employed for the aforementioned uses is generally obtained from the Bayer process. The Bayer process, as is well-known, produces alumina hydrate from aluminous ores by caustic digestion. The digestion results in the formation of a saturated or supersaturated sodium aluminate solution from which the alumina hydrate is obtained by precipitation. The precipitated alumina hydrate is generally filtered, then washed, followed by drying to obtain $Al_2O_3 \cdot 3H_2O$. Even well-washed alumina hydrate often contains in excess of about 0.5 percent by weight sodium containing impurities calculated as $Na_2O$ percent by weight of which about 10-30 percent is leachable. This leachable impurity content renders the hydrate undesirable for many uses and unacceptable for use as flame retardant filler in latex systems. Consequently, it becomes necessary to subject the hydrate to a purification process to make it suitable as filler for polymeric systems, particularly when the hydrate is intended to be used in connection with foamable latex batches.

Many suggestions have already been made for the removal of leachable alkaline impurities from alumina hydrate. Most of these suggested processes involve leaching the filtered and washed hydrate of the Bayer process with a liquid, such as water and preferably an acidic solution. For example, U.S. Pat. No. 2,405,275 proposes purification of alumina hydrate by a two-stage process. This process involves washing of alumina hydrate with hot water, followed by partial calcination to obtain a product having a loss on ignition between about 10-20 percent by weight. This calcined hydrate is then slurried with dilute hydrochloric acid at about 82°C, followed by leaching with water several times. The leached product is then calcined at about 400°C, then again leached with an alkaline solution to neutralize the effects of residual acidic impurities with a final calcination stage at about 537°C to a loss on ignition of 3.3 percent weight. The hydrate after these extensive purification steps contains about 0.05 percent by weight $Na_2O$ and about 0.03 percent by weight Cl-ions. The thus treated hydrate is, however, irreversibly converted to a non-rehydratable active alumina, which does not exhibit the flame retarding properties of alumina hydrate and due to its active surface, can cause upset conditions in latex systems.

Washing with circulating hot water has also been described in U.S. Pat. No. 3,223,483, where selectively calcined alumina, capable of partial rehydration, is contacted with hot water which is circulated through a column of alumina agglomerates. Residual $Na_2O$ contents as low as 0.015 percent have been obtained by this process at leach temperatures between 88°C and 95°C when the leaching has been conducted for 20-24 hours. This purification system, when applied to alumina hydrate present in small particle size, such as is obtained from the Bayer process, causes processing problems in a circulating wash system. Lighter particles will either be in a cocurrent or countercurrent wash stream, carried out of the column causing loss of product. In addition, the pressure drop through a wash column filled with small particle size hydrate will be too high, thus requiring a high pressure wash stream which poses equipment problems. Further, the residence time of the granular product in the column is 20-24 hours which poses processing problems when applied to large quantities of hydrate, such as utilized in the polymer industry.

It has now been discovered that the leachable, alkaline impurity level of alumina hydrate, such as obtained from the Bayer process, can be efficiently and in a simple economic manner reduced to below about 0.015 percent by a short term steam treatment at a temperature between about 60°C and 99°C, preferably at a temperature between about 82°C and about 93°C.

SUMMARY OF THE INVENTION

Bayer process alumina hydrate of the formula $Al_2O_3 \cdot 3H_2O$, having a leachable alkaline impurity level below about 0.015 percent by weight, is produced from impure alumina hydrate by intimately contacting an aqueous slurry of impure alumina hydrate with steam capable of maintaining a temperature between about 60°C and 99°C in the slurry and keeping the slurry during contact with the steam at a temperature between about 60°C and 99°C under agitation for a time period of less than about 4 hours. Purified alumina hydrate is then recovered from the treated slurry. In a continuous process a slurry of impure hydrate is continuously introduced in a treating vessel and treated slurry is continuously removed after an average slurry residence time of less than about 4 hours in the vessel.

DETAILED DESCRIPTION OF THE INVENTION

This invention relates to the purification of alumina hydrate and more specifically, it concerns the removal of leachable alkaline impurities from alumina hydrate obtained from the Bayer process.

In the Bayer process aluminous ore, such as bauxite, is subjected to digestion with a caustic solution at elevated temperature and pressure. The digestion provides a caustic aluminate solution containing the extractable alumina content of the ore in the form of a caustic aluminate. To recover the alumina values from this solution, which is generally referred to as "pregnant liquor," this liquor is separated from caustic insoluble digestion residues usually called "red mud." Following separation, the alumina values are recovered from the pregnant liquor in the form of alumina hydrate ($Al_2O_3 \cdot 3H_2O$) by precipitation. To reduce the load on the filtration equipment generally utilized for the recovery of precipitated alumina hydrate and to increase the precipitation yield, the slurry containing the precipitated alumina hydrate is usually subjected to a "thickening" step, which involves the concentration of the slurry by removing a portion of the water content of the slurry. Thickening can be a single or multistage operation involving particle size classification and concentration resulting in a slurry of alumina hydrate of about 40–60 percent solids content. In the usual Bayer process operation, this slurry is subjected to filtration, washing and drying to produce $Al_2O_3 \cdot 3H_2O$, which can then be utilized for many purposes, for example for fillers, chemical intermediates, reduction grade $Al_2O_3$, or for catalyst base manufacture after suitable purification treatments.

In the process of the present invention, in contrast to prior art hydrate purification processes, the thickened slurry of alumina hydrate is directly subjected to purification, without the requirement of filtration and washing, which steps have been employed by the prior art as a prerequisite to further purification.

In the process of the invention, the thickened slurry obtained from the Bayer process and containing from about 40 percent to about 60 percent by weight $Al_2O_3 \cdot 3H_2O$, is introduced into a treating vessel such as a conventional, vertical tank having a conical bottom and which is equipped with means of agitation, for example a paddle stirrer. The slurry is kept at a temperature between about 60°C and 99°C under agitation in this treating vessel while steam is introduced into the slurry. The steam is preferably introduced at a location which is at or in the proximity of the bottom portion of the treating vessel. Generally good results can be obtained in terms of intimate contact between the slurry and the steam when the steam is charged to the vessel at a point located within the bottom one-third of the vessel in relation to the height of the treating vessel. Steam can be charged to the vessel at one point only or at several different points through conventional pipes, nozzles or jets.

The temperature of the steam charged to the treating vessel is generally sufficient to maintain the slurry at a temperature of about 60°C to about 99°C. Particularly good purification results have been obtained by employing slurry temperatures within the temperature range of about 82°C and 93°C. Slurry temperatures below about 60°C have been found to only partially accomplish the alkaline impurity removal, while temperatures in excess of about 99°C, while accomplishing the purification can cause excessive scaling of the treating vessel.

The average time period involved in the steam treatment is usually less than about four hours and high purity alumina hydrates have been obtained within shorter average time periods, for example, in less than about 2 hours, provided good agitation of the slurry is maintained throughout the steam treatment.

The steam purification treatment of the invention can be achieved in a batch or in a continuous manner. In a continuous process, thickened slurry is continuously introduced in the top half portion of the treating vessel and steam is introduced in the bottom one-third portion of the vessel. The slurry is agitated during the treatment and treated slurry is continuously removed from the vessel at such a rate as to provide an average slurry residence time in the treating vessel of about 4 hours or less.

The steam treated slurry is, after removal from the vessel, filtered by conventional means, washed and dried in the conventional manner employed in the Bayer process.

The aforedescribed steam treatment of thickened Bayer process alumina hydrate slurries provides significantly reduced leachable sodium containing impurity levels. For example, steam treated, filtered, washed and dried alumina hydrates consistently exhibited leachable sodium containing impurity levels below about 0.015 percent by weight of $Al_2O_3 \cdot 3H_2O$, expressed as $Na_2O$ percent, and $Na_2O$ levels of about 0.01 percent or less were readily obtainable by the instant process. In contrast, when the thickened alumina hydrate slurry is subjected to conventional filtration and washing, without the novel steam treatment, the obtained hydrate after drying exhibits leachable impurity contents (expressed as $Na_2O$) in the 0.03–0.05 percent range or more. These high, leachable impurity contents, which are at least 2 to 3 times higher than the leachable impurity level of the steam treated hydrate, require additional and complex purification steps to render the hydrate suitable for the same purposes, for which the steam treated hydrate can be employed directly, without further purification.

It has also been found, that if Bayer process alumina hydrate is, after filtration and washing, reslurried to a slurry concentration of 40–60 percent solids content and then subjected to the steam treatment of the instant invention, the alumina hydrate will have significantly reduced leachable sodium-containing impurity levels (e.g. 0.02 percent $Na_2O$) when compared to alumina hydrate which has only been filtered and washed, but not steam treated.

While the exact mechanism by which the high purity is achieved is not known, it is believed that the steam treatment provides stripping leachable impurities from the available surface of the slurried alumina hydrate.

The following Example and Tables will further illustrate the novel aspects of the invention.

EXAMPLE a. A thickened alumina hydrate slurry, obtained by the digestion of bauxite with sodium hydroxide and having an $Al_2O_3 \cdot 3H_2O$ content of about 50 percent by weight was continuously charged into an indirectly heated, conical vessel of approximately 36.4 m³ (approximately 9,600 gallons) capacity. The slurry was kept at a temperature of about 80°C, while steam was introduced into the vessel from multiple jets at the lower one-third portion of the vessel. The slurry was kept under agitation by a paddle stirrer and to assure more intimate contact between the hydrate particles and the steam, baffles were provided within the vessel. Treated hydrate was continuously removed from the vessel after an average residence time of less than 2 hours. The steam treated hydrate was then filtered on conventional filtration equipment and washed with water. The washed hydrate was then dried at about 90°–110°C for 1–4 hours and then analyzed for leachable impurity content.

b. The steam treatment was repeated by varying the temperature of the slurry from about 60°C to about 99°C. The results of these tests are shown in Table I.

c. In addition to varying the temperature of the slurry, the effect of holding time, e.g., average residence time was also investigated. It was found that within the temperature range employed (60°C–99°C), average residence times of less than about 50 minutes result in incomplete removal of leachable impurities, while holding times in excess of about 4 hours do not significantly improve the degree of purity. Best average residence times in the treating vessel of 36.4 m³ capacity were found to be within the 1–2 hour range.

d. For comparision purposes, thickened Bayer process hydrate slurry, such as used in (a), was, without steam treatment, filtered and then washed in the same manner as the steam treated hydrate of (a). The hydrate was then dried and its leachable alkaline impurity level was determined. The result of the analysis is shown in Table II.

e. The steam treatment was also applied to directly filtered and reslurried alumina hydrate (no steam treatment of the thickened slurry). After filtration and drying of this alumina hydrate, leachable impurity levels of 0.02–0.025 percent by weight Na₂O were found.

The hydrates of (a), (d), and (e) were then tested as fillers in latex compositions to be used in foam form for carpet backings. Sample (d) exhibited excessive shrinkage, sample (e) produced an acceptable shrinkage value, while sample (a) provided a filled foam exhibiting excellent shrinkage property (less than 5.6 percent).

Table I

Effect of Variation of Steam Treatment Temperature on Leachable Impurity Content of Alumina Hydrate

| Slurry temp. °C. | Leachable impurity content % by wt. Na$_2$O* | |
| --- | --- | --- |
| | Test 1 | Test 2 |
| 60 | 0.008 | 0.011 |
| 80 | 0.008 | 0.009 |
| 85 | 0.007 | 0.008 |
| 90 | 0.007 | 0.007 |
| 99 | 0.007 | 0.006 |

*original leachable impurity content 0.031% by wt. Na$_2$O.

Table II

Comparison of Leachable Impurity Contents of Differently Treated Alumina Hydrates [1]

| Sample | (a) | (b) | (c) |
| --- | --- | --- | --- |
| Leachable Impurity Content, Na$_2$O% by wt. | 0.031 | 0.020 | 0.008 |

[1] The same thickened slurry (50% by wt. solids content) was used for all samples.

(a) was only filtered and washed;
(b) was steam treated in slurry form after direct filtration and washing of the thickened slurry; and
(c) was steam treated prior to filtration and washing.

What is claimed is:

1. A process for reducing the leachable sodium-containing impurity level of Bayer process alumina hydrate of the formula $Al_2O_3 \cdot 3H_2O$ to below about 0.015 percent by weight of the hydrate (calculated as $Na_2O$) which comprises intimately contacting an aqueous slurry of alumina hydrate in a treating vessel with steam at atmospheric pressure for an average time period between 1 and about 4 hours, while maintaining the slurry within a temperature range of about 60°C and 99°C under agitation, removing the treated slurry from the vessel and recovering purified hydrate from the slurry.

2. Process of claim 1, wherein the temperature of the slurry is between about 82°C and 93°C and the average contact time is less than about 2 hours.

3. Process of claim 1, wherein the slurry to be treated with steam has a solids content from about 40 percent by weight to about 60 percent by weight.

4. A continuous process for reducing the leachable sodium-containing impurity level of Bayer process alumina hydrate of the formula $Al_2O_3 \cdot 3H_2O$ to below about 0.015 percent by weight of the hydrate (calculated as $Na_2O$), which comprises continuously introducing into a treating vessel an aqueous slurry of alumina hydrate, said slurry having a solids content from about 40 to about 60 percent by weight; continuously introducing steam in the treating vessel, and intimately contacting the slurry therewith at atmospheric pressure while maintaining the slurry under agitation at a temperature between about 60°C and 99°C in the treating vessel for an average residence time between about 1 and about 4 hours; continuously removing treated slurry from the vessel; and recovering purified alumina hydrate from the treated slurry.

5. Process of claim 4, wherein the temperature of the slurry is between about 82°C and 93°C and the average residence time of the slurry in the vessel is between about 1 and about 2 hours.

* * * * *